W. R. LEIBE & A. P. BONNAFFONS.
BIN.
APPLICATION FILED MAR. 25, 1910.
977,318.
Patented Nov. 29, 1910.
2 SHEETS—SHEET 1.
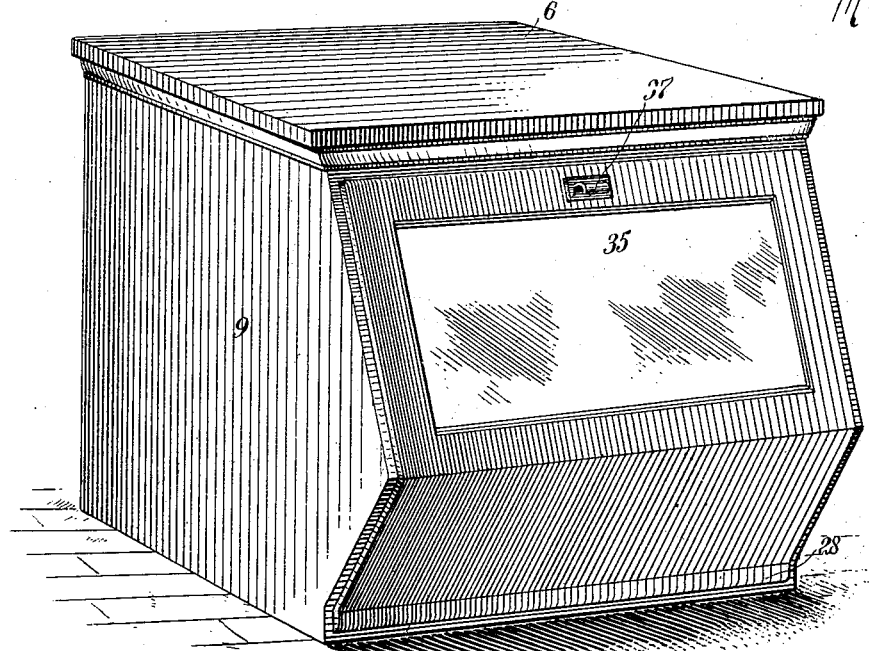
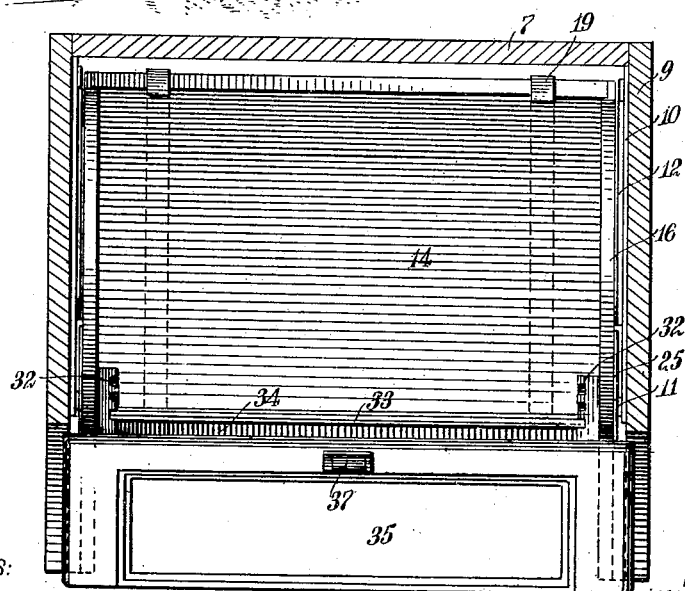
WITNESSES:
George Bambay.
E. B. Marshall
INVENTORS
William R Leibe
Albert P Bonnaffons
BY
Munn & Co.
ATTORNEYS W. R. LEIBE & A. P. BONNAFFONS.
BIN.
APPLICATION FILED MAR. 25, 1910.
977,318.
Patented Nov. 29, 1910.
2 SHEETS—SHEET 2.
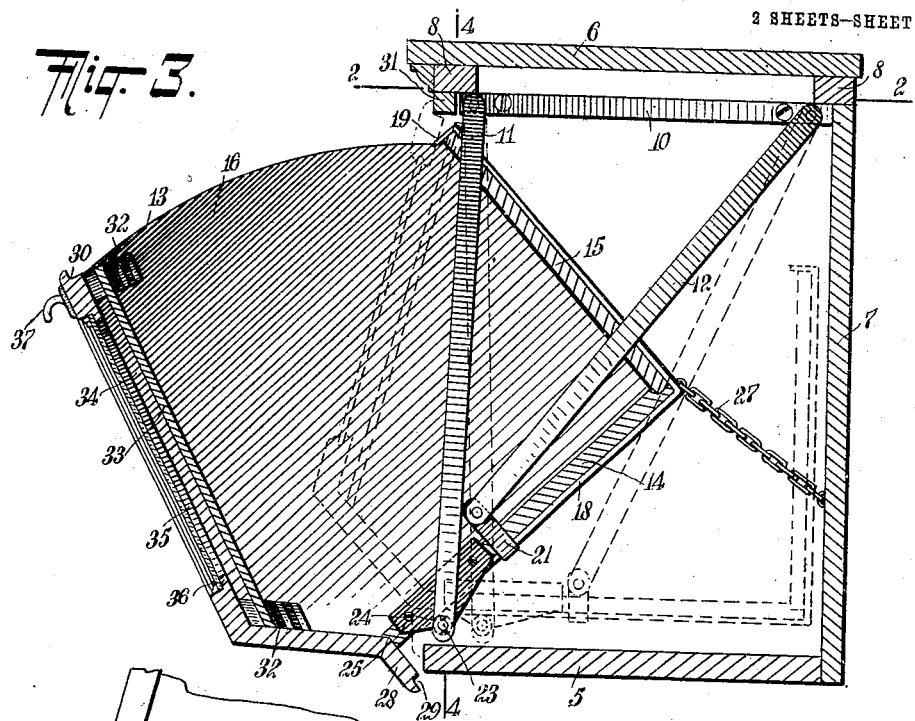
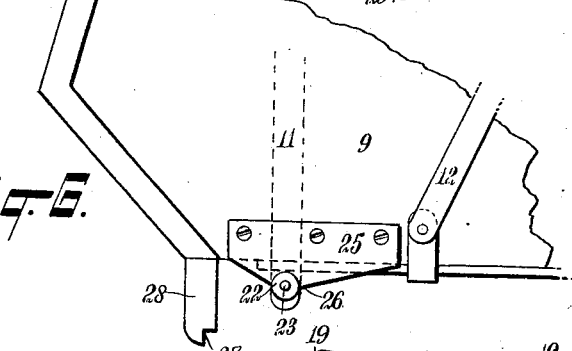
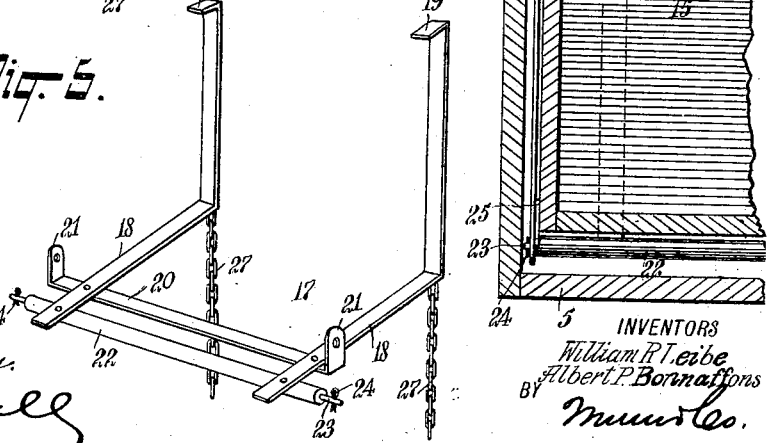
WITNESSES:
George Bambay
J. B. Marshall
INVENTORS
William R. Leibe
Albert P. Bonnaffons
BY Munn & Co.
ATTORNEYS

UNITED STATES PATENT OFFICE.

WILLIAM R. LEIBE AND ALBERT P. BONNAFFONS, OF NEW ORLEANS, LOUISIANA.

BIN.

977,318.

Specification of Letters Patent.   Patented Nov. 29, 1910.

Application filed March 25, 1910.  Serial No. 551,674.

*To all whom it may concern:*

Be it known that we, WILLIAM R. LEIBE and ALBERT P. BONNAFFONS, both citizens of the United States, and residents of New Orleans, in the parish of Orleans and State of Louisiana, have invented a new and Improved Bin, of which the following is a full, clear, and exact description.

Our invention relates to bins, and has for its object to provide one which is normally disposed above a shelf, the bin being provided with supports by which it may be readily tilted forward and downwardly, to enable the storekeeper to remove the merchandise from the bin, the bin being surrounded by a casing when disposed over the shelf, the casing fitting the bin to prevent any dust or foreign matter from entering.

Still other objects of the invention will appear in the following complete description.

In this specification we will describe the preferred form of our invention, it being understood that the scope of the invention is defined in the appended claims.

Reference is to be had to the accompanying drawings forming a part of this specification, in which similar characters of reference indicate corresponding parts in all the views, and in which—

Figure 1 is a perspective view of our improved bin; Fig. 2 is a sectional view on the line 2—2 of Fig. 3; Fig. 3 is a transverse sectional view; Fig. 4 is a similar view on the line 4—4 of Fig. 3; Fig. 5 is a perspective view of the cradle by which the bin is secured; and Fig. 6 is a fragmentary view showing the positions of the links relatively to the bin when it is normally disposed over the shelf.

By referring to the drawings it will be seen that a horizontal member forming a shelf 5, is provided, above which and spaced therefrom, there is another horizontal member 6, there being a vertical member 7 disposed between the horizontal members 5 and 6 at their rear. The horizontal member 6 is secured to transverse members 8. The members 5, 6 and 7 form the bottom, the top and the rear of a casing, there being members 9, which are secured to the members 5, 6 and 7, which form the sides of the casing. To the inner sides of the casing are secured, near their top, supports 10, there being links 11, one of which is pivoted to each of the supports 10 at their front ends. Additional links 12 are pivoted to the supports 10 near the vertical rear member 7. A bin 13 has a bottom 14 which is adapted to be disposed a little above the horizontal member 5 of the casing, the bin having a rear wall 15 and side walls 16. The front wall of the bin 13 is disposed upwardly and outwardly a distance from its bottom 14, the front wall of the bin then being continued upwardly and inwardly to its top. To the bottom and rear wall of the bin is secured a cradle 17, the cradle 17 having strips 18, one disposed at each of the outer sides of the bottom 14 of the bin 13, the strips 18 then being bent upwardly against the rear wall 15 of the bin and having flanges 19 which are secured to the top of the said rear wall. These strips are preferably constructed of metal and they are connected by a transverse metal strip 20, which projects at each side beyond the strips 18, the terminals of the strips 20 being bent upwardly to form flanges 21. The metal strips 18 are connected by an additional transverse member 22, which is preferably cylindrical in shape and has pivots 23 projecting from its terminals, these pivots 23 having orifices therethrough in which are cotter pins 24. Secured to each side of the bin 13 near its bottom, are plates 25 which have notches 26 in which are disposed the cylindrical transverse member 22. The plates 25 are disposed near the front of the bottom 14 for a purpose which will hereafter be set forth.

The links 11 have orifices at their lower terminals, in which are disposed the pivots 23 respectively, the cotter pins 24 being provided to prevent the links 11 from slipping from the said pivots 23. The links 12 are pivoted to the flanges 21, which are disposed in close proximity to the plates 25, these plates being disposed near the front of the bottom 14, as has been stated.

As will be clearly understood by reference to the drawings, the links 11 are pivoted to the cradle, which is secured to the bin at points which are immediately beneath the center of gravity of the bin when it is moved forwardly from the rear member 7 of the casing a short distance, there being chains 27 which are secured to the rear of the metal strips 18 and to the rear member 7 of the casing, these chains being provided to limit the forward movement of the bin, so that when it is drawn forward, it will be permitted to move only a short distance after the center of gravity of the bin is immediately over the pivotal connection of the bin to the links 11.

To the bottom of the bin, at its front end, is secured a depending flange 28, which has a recess 29 cut therein, so that the flange will fit snugly against the lower horizontal member 5 of the casing, the top of the front of the bin having a recess 30 to permit it to fit snugly against a member 31 secured across the front of the casing at its top. At the inner sides of the bin 13, at the top and bottom, near the front, are series of grooves 32, in which may be disposed a partition 33 forming a compartment 34, a pane of glass 35 being inserted in an opening 36 in the front of the bin, so that the prospective purchasers may see the goods as they are displayed in the said compartment 34, which has as its bottom the lower portion of the front of the bin disposed at an angle to the upper portion.

The bin 13 is normally disposed within the casing, as shown by dotted lines in Fig. 3 of the drawings. When the storekeeper wishes to remove some of the merchandise contained in the bin, he, by means of a handle 37, draws the bin 13 forwardly, the bin swinging on the pivots 23 downwardly, and the links 11 swinging outwardly to permit the storekeeper readily to obtain the merchandise from within the bin. As the links 12 are pivoted above the bottom of the bin 13 and in close proximity to the pivots 23, they swing easily on their pivots, which connect them with the supports 10, while the bin is moved forwardly and downwardly, as has been described. The chains 27 connect the metal strips 18 with the rear, vertical member 7 of the casing to limit the forward and downward movement of the bin when drawn outwardly by the storekeeper.

Having thus described our invention, we claim as new and desire to secure by Letters Patent:

1. A support, a cradle having transverse and side members, a bin, the side members being disposed against the bottom of the rear of the bin and being secured thereto, two plates with notches secured to the bin, one of the transverse members being disposed in the notches, two links pivoted to the support and to one of the transverse members, and two additional links pivoted to the support and to the cradle.

2. A support, a cradle having transverse and side members, a bin, the front wall of which is disposed upwardly and outwardly a distance from its bottom, the side members of the cradle being disposed against the bottom of the rear of the bin and being secured thereto, two plates, with notches, secured to the sides of the bin respectively near the bottom and in close proximity to its front wall, one of the transverse members being disposed in the notches, two links pivoted to the support and to one of the transverse members, and two additional links pivoted to the support and to the cradle.

3. Two horizontal members, one disposed over the other, a rear member connecting the horizontal members, a bin adapted to be disposed between the horizontal members, the front wall of the bin extending upwardly and outwardly for a distance, a depending flange at the front of the bin adapted to engage the lower horizontal member when the bin is normally disposed, a flange extending upwardly from the bin for engaging the upper horizontal member when the bin is normally disposed, two links pivoted relatively to the upper horizontal member, the two links being also pivoted to the bin near the depending flange, the bin being free to be swung forward on the links and be rocked relatively to the links when thus swung, and two additional links pivoted relatively to the upper horizontal member, the additional links being also pivoted to the bin.

In testimony whereof we have signed our names to this specification in the presence of two subscribing witnesses.

WILLIAM R. LEIBE.
ALBERT P. BONNAFFONS.

Witnesses:
A. J. PETERS,
K. C. EVANS.